United States Patent
Neela et al.

(10) Patent No.: US 11,291,160 B2
(45) Date of Patent: Apr. 5, 2022

(54) AGRICULTURAL HARVESTER AND A DUST EXTRACTOR FOR THE AGRICULTURAL HARVESTER

(71) Applicant: CNH Industrial America LLC, New Holland, PA (US)

(72) Inventors: Suresh Neela, Kurnool (IN); Arvind Chauhan, Chamba (IN)

(73) Assignee: CNH Industrial America LLC, New Holland, PA (US)

( * ) Notice: Subject to any disclaimer, the term of this patent is extended or adjusted under 35 U.S.C. 154(b) by 286 days.

(21) Appl. No.: 16/422,280

(22) Filed: May 24, 2019

(65) Prior Publication Data

US 2019/0357437 A1  Nov. 28, 2019

(30) Foreign Application Priority Data

May 25, 2018  (IN) .............................. 201821019706

(51) Int. Cl.
*A01D 41/12*  (2006.01)
*A01D 61/00*  (2006.01)

(52) U.S. Cl.
CPC ....... *A01D 41/1252* (2013.01); *A01D 61/008* (2013.01)

(58) Field of Classification Search
CPC .......................... A01D 41/1252; A01D 61/008
USPC ......................................................... 56/12.8
See application file for complete search history.

(56) References Cited

U.S. PATENT DOCUMENTS

| | | | |
|---|---|---|---|
| 2,832,187 A | 4/1958 | Johnson | |
| 3,094,829 A | 6/1963 | Claas | |
| 3,187,491 A | 6/1965 | Karlsson | |
| 3,213,598 A | 10/1965 | Olsson | |
| 5,322,472 A | 6/1994 | Little | |
| 6,036,600 A | 3/2000 | Kruckman | |
| 6,921,330 B2 * | 7/2005 | Grywacheski | A01F 12/444 416/187 |
| 8,062,109 B1 * | 11/2011 | Pearson | A01D 41/1252 460/59 |
| 8,920,226 B2 * | 12/2014 | Duquesne | A01D 75/187 460/105 |
| 10,098,280 B2 * | 10/2018 | Busser | A01D 41/06 |
| 2017/0099777 A1 * | 4/2017 | Weeks | A01F 12/446 |
| 2020/0315086 A1 * | 10/2020 | Noll | A01D 34/003 |

* cited by examiner

*Primary Examiner* — Alicia Torres
*Assistant Examiner* — Matthew Ian Neal
(74) *Attorney, Agent, or Firm* — Peter Zacharias; Patrick Sheldrake

(57) ABSTRACT

A dust management system for an agricultural harvester includes a perforated tube extending transversely through a feeder housing of the harvester. The perforated tube has exhaust plenums at opposite ends directing any flow towards the ground over which an agricultural harvester operates. A longitudinal drive shaft mounts axial flow fans within the exhaust plenums and a drive shaft is driven through a pulley system so that rotation of the drive shaft induces flow through the perforated tube and out of the exhaust plenum.

15 Claims, 2 Drawing Sheets

AGRICULTURAL HARVESTER AND A DUST EXTRACTOR FOR THE AGRICULTURAL HARVESTER

FIELD OF THE INVENTION

The present invention relates to agricultural harvesters, and, more specifically, to dust management systems for such agricultural harvesters.

BACKGROUND OF THE INVENTION

Agricultural harvesters are used to harvest agricultural crops such as corn, soybeans, wheat and other grain crops. As the agricultural harvester is driven through crop fields, the agricultural harvester cuts the crop, separates the desired crop from the undesired waste, also known as material other than grain (MOG), stores the crop and discards the waste.

In a typical agricultural harvester, a header is mounted to the front of the agricultural harvester to gather the crop and feed the crop into the agricultural harvester for processing. As the agricultural harvester is driven through the field, the crop material is collected by the header and deposited into a feeder housing. The material is then transported upwardly and into the agricultural harvester by a feed elevator located within the feeder housing. The crop material then passes through a threshing and separating system. In a rotary agricultural harvester, the threshing and separating system usually includes a rotor, a threshing concave, a rotor cage and a separating grate. As crop material passes between the rotor, the threshing concave and the separating gate, the crop material is impacted and/or rubbed thereby causing the grain to separate from the stalk material. The stalk material that is separated from the grain is commonly referred to as MOG. Other types of agricultural harvesters are known that perform similar functions using different mechanisms.

After passing through the threshing and separating system, the grain and MOG are deposited onto a grain cleaning system. The grain cleaning system of the typical agricultural harvester includes a plurality of adjustable cleaning sieves often referred to as a chaffer sieve and a shoe sieve and sometimes a pre-cleaning sieve. These sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the agricultural harvester. Grain which is heavier than MOG is allowed to drop through the openings in the sieve.

The clean grain that falls through the cleaning sieves is deposited on a collection panel positioned between the cleaning sieves. The collection panel is angled so as to promote the grain to flow, under the influence of gravity, onto a conveyor such as an auger trough positioned along the lower most edge of the collection panel. The auger trough is typically positioned near the forward end of the cleaning sieves and extends along the width of the sieves. The grain collected in the auger trough is then moved by an auger towards the side of the agricultural harvester where it is raised by a grain elevator and deposited into a storage tank or grain tank. Other systems also exist that can utilize for example, a loop conveyor system which eliminates the need for a conventional cross auger.

A typical agricultural planting and harvesting cycle throughout the world involves planting the crops at the beginning of the growing season and then harvesting the crops at the end of the season. For many crops, the moisture content at harvest is an important factor in the storage ability of the crop and in the price the crop commands at market. Low moisture content is a common objective in a harvesting environment. The low moisture content is particularly desired for grain crops that have smaller particle sizes.

One consequence of having a low moisture crop for harvest is that material other than grain (MOG), including fine dust particles, is generated and is blown around to such an extent that it can obscure the vision of the operator of the agricultural harvester. If the agricultural harvester has no cab, the problem is made more acute as it provides an adverse environment for the operator.

What is needed in the art therefore, is a system for managing the dust generated in the agricultural harvesting environment.

SUMMARY OF THE INVENTION

The present invention seeks to manage and divert dust in the harvesting environment in a way that it minimizes the visual and environmental adverse effects on a harvester operator.

In one form, the invention is a dust collector for an agricultural harvester having a header for harvesting crop over the ground and a feeder housing receiving harvested crop from the header. The dust collector includes a perforated tubular housing extending between the outer walls of the feeder housing and exhaust plenum chambers connected to opposite ends of the tubular housings with each having an outlet directed at least towards the ground. A drive shaft extends longitudinally through the perforated tube and is journaled for rotation within the tube. Impellers are mounted on the shaft adjacent its ends for directing air flow out of the outlets upon rotation of the drive shaft. A drive mechanism is connected to and selectively rotates the drive shaft to induce air flow and dust out of the feeder housing.

In another form, the invention is an agricultural harvester having a header for harvesting crop over the ground, a feeder housing receiving harvested crop from the header and a crop processing unit receiving harvested crop from the feeder housing. A perforated tubular housing extends between the outer walls of the feeder housing and has exhaust plenum chambers at opposite ends of the tubular housing with each having an outlet directed at least towards the ground. A drive shaft extends longitudinally through the perforated tube and is journaled for rotation with impellers adjacent the ends for directing air flow out of the outlets upon rotation of the drive shaft. A drive mechanism is connected to and selectively rotates the drive shaft to induce air flow and dust out of the feeder housing.

One advantage of the present invention is an efficient and effective way of diverting dust to an area along the ground and below an agricultural harvester operator.

Another advantage is that the dust management system provides a minimum intrusion on the overall envelope of the agricultural harvester.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
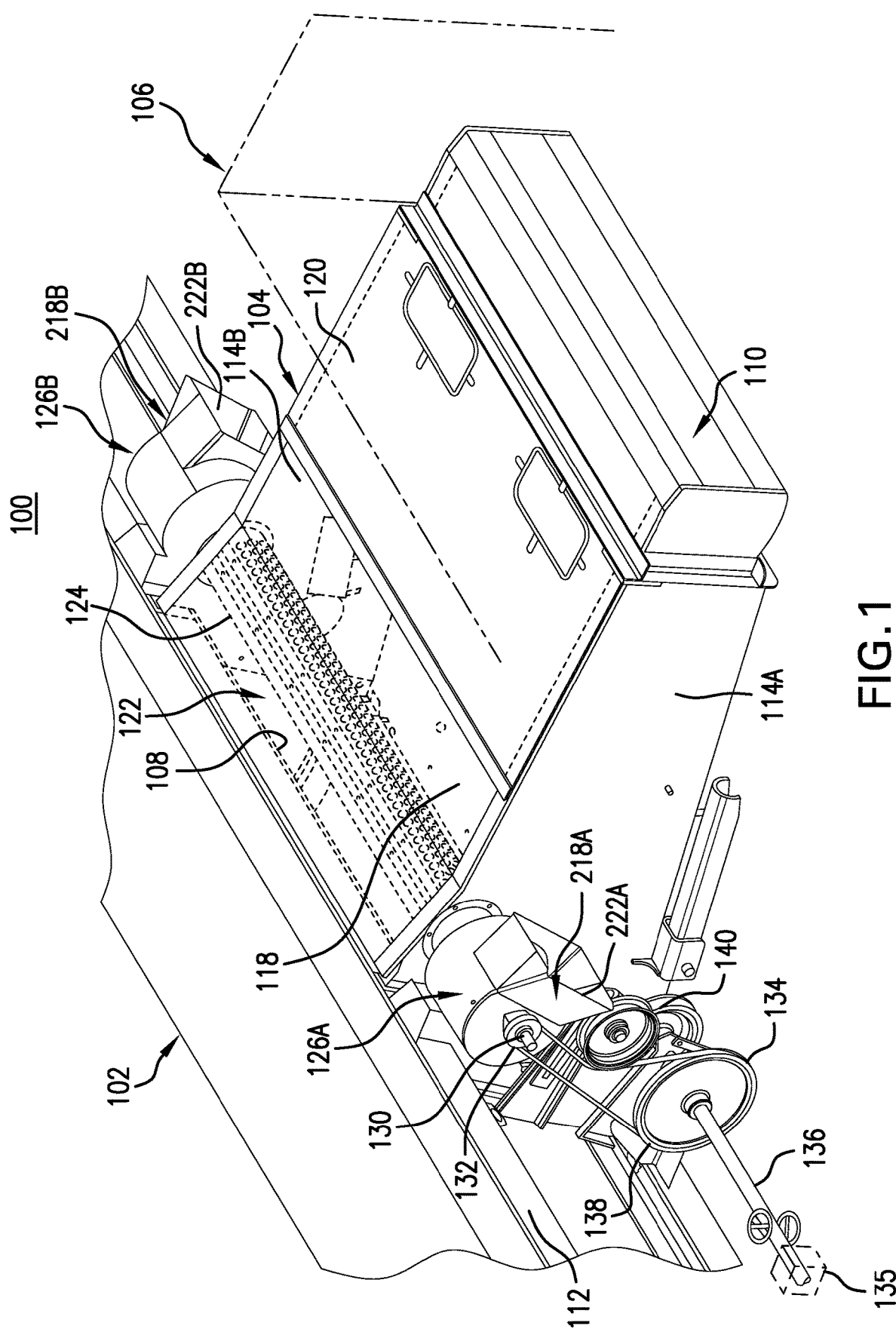
FIG. 1 illustrates a partial perspective view of an exemplary embodiment of an agricultural harvester, the agricultural harvester including a dust collector, in accordance with an exemplary embodiment of the present invention; and, FIG. 2 illustrates the dust collector shown in FIG. 1, in accordance with an exemplary embodiment of the present invention.

Referring to FIG. 1, an agricultural harvester 100 is illustrated. The agricultural harvester is configured for mobile operation across a field in a harvesting direction A so that a header 102 cuts the agricultural crop to be harvested and moves it towards its center where it passes to a feeder housing 104 having a conveyor to move the cut crop into a crop processing unit illustrated schematically at 106. The crop processing unit 106 will receive the harvested crop and separate the crop from the additional material, eventually depositing it in a storage unit before it is transferred to an external vehicle for collection, and then discharging the MOG onto the field at the rearmost portion of the agricultural harvester. The motive power for the agricultural harvester 100 usually is provided by a diesel engine which drives the agricultural harvester to harvest crop and between fields as well as provide power for all the mechanisms and units that cut the crop, transfer it and process it. These details are not shown to enable a clearer focus on the present invention.

The feeder housing 104 has a feeder housing inlet 108 from the header 102 and a feeder housing outlet 110 discharging the harvested crop into the crop processing unit 106. The feeder housing inlet 108 is secured to a header frame 112 forming the structural support for the header 102. Left and right side panels 114A and 114B extend from the header from and a floor 118 extends between the left and right side panels 114A and 114B. An upper panel 120 extends between the right and left side panels 114A and 114B to complete the passage making up the feeder housing 104. A portion of the upper panel 120 is not shown to illustrate additional components. Typically, a conveyor assembly is supported in the feeder housing 104 along the floor and when activated, moves harvested material in a direction opposite to harvesting direction A to the crop processing unit 106. The detail mechanism and configuration of the conveyor is not illustrated to enable a clearer understanding of the present invention.

During the process of harvesting the crop using the header 102 and conveying it towards the crop processing unit 106 through the feeder housing 104, dry conditions cause the generation of significant quantities of particulate material and dust which can obscure the operators vision and/or create an adverse environment. In accordance with the present invention, a dust extractor 122 is employed to extract and direct accumulated dust within the feeder housing 104 in a way that it does not impair the vision of the operator. The dust extractor 122 includes a perforated tubular element 124 extending between and affixed to side panels 114A and 114B towards the end of the feeder housing adjacent the feeder housing inlet 108. The dust extractor 122 extends transversely relative to the harvesting direction A. Left and right exhaust plenum chambers 126A and 126B are connected to the ends of perforated tubular element 124.

A drive shaft 130 extends into the perforated tubular element 124 and has a driven pulley 132 affixed to its end. A drive pulley 134 is mounted onto the power shaft 136 of a power train schematically shown at 135. An endless belt 138 is wrapped over the drive pulley 134 and driven pulley 132. An idler pulley 140 is urged against the endless belt 138 to maintain proper tension to enable driving of the drive shaft 130. It is to be understood that the power train 135 and other elements are appropriately mounted to a frame for agricultural harvester 100 (not shown). The power train 135 usually receives rotary power from the same source as used to drive a conveyor through the feeder housing 104 and the cutting and transfer mechanisms of the header 102.

Figure 2:
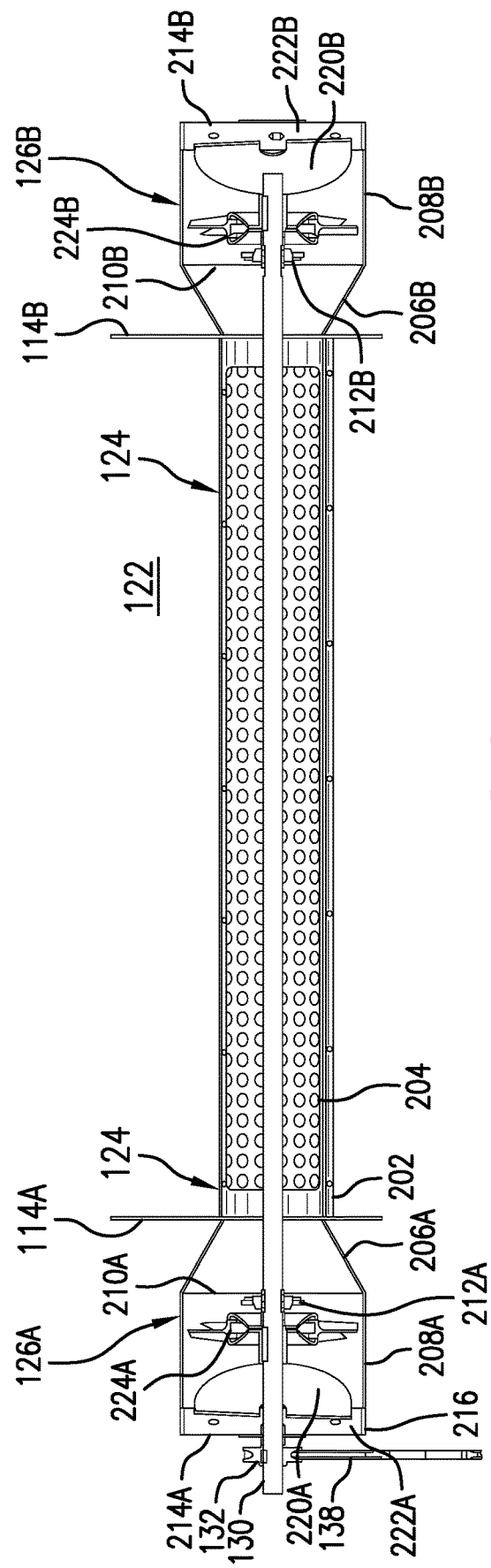

Referring to FIG. 2, there is shown a more detailed illustration of the internal elements of the dust extractor assembly 122. The tubular element 124 is formed from a transverse tube 202 having a plurality of openings or perforations 204. The tube extends between left and right side walls 114A and 114B. A left frustoconical transition section 206A and a right frustoconcial transition section 206B connect to the ends of transverse tube 202 and form an expanding flow path that connects with a left cylindrical section 208A and a right cylindrical section 208B. A bearing support strut 210A extends from the left cylindrical section 208A to a left bearing assembly 212A for supporting the left end of the drive shaft 130. A right bearing support strut 210B extends from the right cylindrical section 208B to support a right bearing assembly 212B. Left and right bearing assemblies 212A and 212B support and journal drive shaft 130 longitudinally within the perforated tube 124. The end of left cylindrical section 208A has an end wall 214A. The right cylindrical section 208B has an end wall 214B. The left end wall 214A has a bearing assembly 216 affixed into it to support the left end of drive shaft 130 adjacent the driven pulley 132. Referring additionally to FIG. 1, a left exhaust 218A extends from the left cylindrical section 208A. A right exhaust 218B extends from the right cylindrical section 208B. As is shown in FIG. 1, the exhaust 218A and 218B are oriented in a downward aft direction so as to direct any outward flow downwards and away from an operator station. A left deflector plate 220A has an angled orientation relative to the axis of and extends over the drive shaft 130 to abut the circular interior of right cylindrical section 208A to provide directed flow at an angle transitioning between the axial flow out the end of the perforated tube 124 to the direction out the left exhaust 218A. In order to complete the transition a left divergent exhaust wall 222A is substantially in the same plane as the deflector 220A. A corresponding deflector 220B is mounted in the right cylindrical section 208B and has a corresponding right divergent exhaust wall 222B.

A left axial flow blower 224A is mounted in left cylindrical section 208A adjacent bearing assembly 212A and has blades configured to urge flow in an axial direction upon rotation of drive shaft 130 to which it is attached. A right axial flow blower 224B is positioned in cylindrical section 208B adjacent bearing assembly 212B to provide a similar movement of flow out of the perforated tube 124. As is apparent to those skilled in the art, the orientation of the blades for the axial flow blowers are such that the flow is out of the perforated tube 124 upon rotation drive shaft 130 in a given direction.

In operation, the drive shaft 130 is driven from the power train 135 through the endless belt 138 and associated pulleys to spin the axial flow blowers 224a and 224b to pull flow out of the perforated tube 124 and out of the feeder housing 104. The driven pulley 132 is substantially smaller than the drive pulley 134 so as to produce an increase in RPM sufficient to initiate a significant flow out of the perforated tube 124. A non-limiting example of the step up RPM would be 3.7 to 1. The openings or perforations 204 are selected to be between approximately 24.45% and 27.34% of the interior wall area of transverse tube 202. This provides an appropriate flow of material without significant clogging of the openings 204. As a result, the dust particles and fine particles generated and found within the feeder housing 104 are extracted and directed downwards away from an operators view and environment.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A dust collector for an agricultural harvester having a header for harvesting crop over the ground and a feeder housing receiving harvested crop from said header, said dust collector comprising:
    a perforated tube extending between the outer walls of the feeder housing and having opposite ends;
    exhaust plenum chambers connected to said opposite ends of said perforated tube, each of the exhaust plenum chambers having an outlet directed at least towards the ground;
    a drive shaft extending longitudinally through said perforated tube and journaled for rotation therein, the drive shaft having ends;
    impellers mounted on and adjacent the ends of said drive shaft for directing air flow out of said outlets upon rotation of said drive shaft; and
    a drive mechanism connected to and selectively rotating said drive shaft to induce air flow and dust out of the feeder housing,
    wherein said exhaust plenum chambers each further have a divergent section from said opposite ends of said perforated tube to a main chamber of said exhaust plenum chambers.

2. The dust collector as claimed in claim 1, wherein said divergent section of each of said exhaust plenum chambers is a frustoconical component and a main portion of each of said exhaust plenum chambers has a cylindrical configuration.

3. The dust collector as claimed in claim 2, wherein said impellers are axial flow fans in said cylindrical exhaust plenum chambers.

4. The dust collector as claimed in claim 3, further comprising a deflector downstream of each of said fans and directed at least towards the ground.

5. The dust collector as claimed in claim 4, wherein the deflector is a plate angled with respect to the longitudinal axis of said drive shaft.

6. The dust collector as claimed in claim 1, wherein the drive shaft is journaled by bearings supported by the walls of said exhaust plenum chambers.

7. The dust collector as claimed in claim 6, wherein the drive mechanism comprises a driven pulley and a tensioner adjacent said driven pulley and a drive pulley to rotate said drive shaft.

8. The dust collector as claimed in claim 1, wherein an area of the perforations in said perforated tube range from about between 24.45% to 27.34% of an internal surface area of the tube.

9. The dust collector as claimed in claim 7, wherein said drive and driven pulley have a step up ratio of approximately 3.7 to 1.

10. An agricultural harvester for harvesting agricultural crop over the ground and comprising:
    a header for harvesting agricultural crop over the ground and directing it to a central location;
    a feeder housing connected to a central portion of said header for receiving cut crop and directing it in a rearward direction;
    a crop processing apparatus connected to and receiving cut crop from said feeder housing for processing the crop;
    a dust collector comprising:
        a perforated tube extending between the outer walls of the feeder housing and having opposite ends;
        exhaust plenum chambers connected to said opposite ends of said perforated tube, each of the exhaust plenum chambers having an outlet directed at least towards the ground;
        a drive shaft extending longitudinally through said perforated tube and journaled for rotation, the drive shaft having ends;
        impellers mounted on and adjacent the ends of said drive shaft for directing air flow out of said outlets upon rotation of said drive shaft; and,
        a drive mechanism connected to and selectively rotating said drive shaft to induce air flow and dust out of the feeder housing,
        wherein said exhaust plenum chambers each have a substantially cylindrical shape and further a frustoconical section connecting the cylindrical shape to said opposite ends of said perforated tube forming a divergent flow area into said exhaust plenum chambers.

11. The agricultural harvester as claimed in claim 10, wherein said impellers are axial flow fans positioned in said exhaust plenum chambers.

12. The agricultural harvester as claimed in claim 11, further comprising an angled plate downstream of each of said axial flow fans, each said plate being angled with respect to the longitudinal axis of said drive shaft.

13. The agricultural harvester as claimed in claim 12, wherein said drive shaft is journaled by bearings supported by walls of said exhaust plenums and said drive mechanism comprises a pulley affixed to one end of said drive shaft, a tensioner pulley engageable with the driven pulley, a drive pulley powered from said agricultural harvester and a drive belt interconnected between the driver pulley, tensioner and driven pulley.

14. The agricultural harvester as claimed in claim 10, wherein the perforations in said perforated tube are approximately between 24.45% and 27.34% of the an internal surface area of said tube.

15. The agricultural harvester as claimed in claim 13, wherein said drive and driven pulley have a step up ratio of approximately 3.7 to 1.

\* \* \* \* \*